United States Patent Office 3,454,631
Patented July 8, 1969

3,454,631
PREPARATION OF TETRACHLOROETHYL SULFENYL CHLORIDE WITH SULFUR DICHLORIDE
Herbert P. C. Lee, San Pablo, Calif., assignor to Chevron Research Company, San Francisco, Calif., a corporation of Delaware
No Drawing. Filed Feb. 11, 1965, Ser. No. 432,001
Int. Cl. C07c *145/00*
U.S. Cl. 260—543     4 Claims

ABSTRACT OF THE DISCLOSURE

Method for selectively preparing 1,1,2,2-tetrachloroethyl sulfenyl chloride by reacting trichloroethylene with sulfur dichloride at about 0 to 200° C. In the lower portions of the above temperature range, i.e., 0 to 80° C., it is desirable to use a free radical catalyst, such as visible light, in the reaction.

---

This invention concerns a novel method of preparing polyhaloalkyl sulfenyl chlorides. More particularly, this invention concerns the direct addition of sulfur dichloride to trichloroethylene to obtain the tetrachloroethyl sulfenyl chloride.

It has recently been found that 1,1,2,2-tetrachloroethyl sulfenyl chloride is a unique precursor to the preparation of a variety of desirable pesticidal compounds. The 1,1,2,2-tetrachloroethyl sulfenyl chloride is particularly desirable in the preparation of a number of useful fungicides.

The preparation of the 1,1,2,2-tetrachloroethyl sulfenyl chloride has required an involved and circuitous method of preparation. Thus, sulfur monochloride was reacted with 1,2-dichloroethylene produce the bis(1,2,2-trichloroethyl)disulfide, cleaving the disulfide with chlorine to form the 1,2,2-trichloroethyl sulfenyl chloride and then α-chlorinating with chlorine in the presence of sulfuric or chlorosulfonic acid to finally produce the 1,1,2,2-tetrachloroethyl sulfenyl chloride.

The addition of sulfur monochloride to 1,1,2-trichloroethylene yields almost quantitatively the bis(1,2,2,2-tetrachloroethyl)disulfide which cleaves to the 1,2,2,2-tetrachloroethyl sulfenyl chloride. When reacting sulfur dichloride with 1,1,1 - trichloropropene, the 1,1,1,2 - tetrachloroisopropyl sulfenyl chloride may be produced directly. However, applying the sulfur dichloride reaction to ethylene results in the conventional mustard gas reaction yielding the bis(2-chloroethyl)monosulfide.

It has been found that the reaction of sulfur dichloride with 1,1,2-trichloroethylene is specific to the direct formation of 1,1,2,2-tetrachloroethyl sulfenyl chloride. This reaction may be carried out at temperatures ranging from 0 to 200° C. When the reaction is carried out at temperatures near the lower end of this temperature range, say between 0 and about 80° C., it is considered desirable to operate in the presence of a free radical catalyst.

Physical free radical catalysts which may find use in the process are visible light, ultraviolet light, gamma-rays, and ultrasonic waves. Among the physical free radical catalysts, visible light below about 4000 A., and more particularly between 2500–4000 A., is preferred.

Illustrative of the chemical free radical catalysts which may be used are organic peroxides such as acetyl peroxide, benzoyl peroxide, hydroxyheptyl peroxide, methylethyl ketone peroxide, cyclohexanone peroxide, cumene hydroperoxide, t-butyl hydroperoxide, di-t-butyl diperphthalate, p-chlorobenzoyl peroxide and di-t-butyl peroxide, and organic azo compounds such as azo-bis-(isobutyronitrile).

At temperatures in excess of about 80° C., i.e., from about 80 to 200° C., the thermal input to the process is sufficient in and of itself to produce higher reaction rates and product conversions. As the introduction of heat to the process is more practical than introducing free radical catalysts, it is anticipated that the process will usually be conducted at temperatures in excess of 80° C. Therefore, in the absence of a catalyst, temperatures in the range of from about 80 to 200° C. are preferred, with temperatures from about 80–150° C. being particularly preferred.

The mol ratio of the sulfur dichloride to trichloroethylene will generally be in the range of about 1:0.01–100, preferably in the range of about 1:1–5. Mol ratios approximating 1:1 are particularly preferred.

An inert solvent may be used in the process with the proviso that when a light catalyst is used the solvent must be transparent to the light source. Usually, however, it is most convenient to carry out the reaction neat; that is, using only the reactants and, if any, catalyst in the reactor.

The reaction may be carried out in the liquid or vapor phase, either continuously or batchwise. Depending on the materials used and the phase desired, pressures above and below atmospheric pressure may be used. However, the particular pressure is one of convenience and is not critical to this invention.

It is found that the reaction does not go to completion but stops prior to consumption of all of the reactant present in the lower mole ratio. However, by separating the product from the unreacted reactants and recycling the unreacted reactants, the conversion may be increased so that higher overall conversions are obtained. The time for the individual cycle will generally be in the range of from ¼ to 10 hours.

At the end of the reaction, the reactants are conveniently separated from the reaction product by distillation and the reaction product may be further purified if desired. Methods of purification, such as fractional distillation, chromatography, etc., are well known in the art and do not require exemplification here.

The following examples are offered by way of illustration and not by way of limitation.

EXAMPLE 1

Into a Pyrex tube were charged 155 gms. $SCl_2$ and 395 gms. trichloroethylene, representing a mol ratio of $SCl_2$ to trichloroethylene of 1:2. The tube was sealed off with a thermowell and heated at 100–108° C. for a period of three hours. At the end of this time, volatiles, consisting primarily of unreacted starting materials, were removed at 30° C. and 10 mm. Hg, finally dropping the pressure down to 0.1 mm. Hg, leaving 93 gm. of residue. Gas liquid chromatography showed the residue to be 98.5% by weight of the desired 1,1,2,2-tetrachloroethyl sulfenyl chloride.

EXAMPLE 2

Into a reaction vessel was introduced 26 gms. $SCl_2$ and 33 gms. of trichloroethylene. The mixture was irradiated with two 500-watt G.E. reflector photolamps. The mixture was stirred and maintained at temperatures ranging from 50–60° C. for a three-hour period. The mixture was stripped, first at 30° C., 20 mm. Hg and then at 25° C., 0.1 mm. Hg, leaving 31.4 gms. residue. Gas liquid chromatography showed the residue to be 90% by weight of the desired 1,1,2,2-tetrachloroethyl sulfenyl chloride.

EXAMPLE 3

Into a 250 ml. round-bottom flask was charged 51.5 gms. $SCl_2$, 65.8 gms. trichloroethylene and 4 gms. benzoyl peroxide. The mixture was refluxed for a period of four hours. The volatiles were removed in vacuo at 0.1 mm. Hg, leaving 32.8 gms. of residue. Gas liquid chromatography showed that the residue was 69% by weight of the desired 1,1,2,2-tetrachloroethyl sulfenyl chloride.

EXAMPLE 4

Into a vessel were charged 210 gms. $SCl_2$ and 270 gms. trichloroethylene. This mixture was stirred and irradiated with two 275-watt G.E. sunlamps placed at a distance of 4 inches from the vessel for a period of 3 hours. Temperature varied between 25–91° C. Volatiles, consisting primarily of unreacted starting materials, were stripped off leaving 238 gms. of residue. This residue was analyzed and determined to be 90 weight percent 1,1,2,2-tetrachloroethyl sulfenyl chloride.

As will be evident to those skilled in the art, various modifications on this process can be made or followed, in the light of the foregoing disclosure and discussion, without departing from the spirit or scope of the disclosure or from the scope of the following claims.

I claim:

1. Method for preparing 1,1,2,2-tetrachloroethylsulfenyl chloride which comprises reacting trichloroethylene with sulfur dichloride at a temperature of 80–200° C. and at atmospheric or autogenous pressure in the absence of a free radical catalyst.

2. The method according to claim 1 wherein said temperature is in the range of from about 80–150° C.

3. The method of claim 1 wherein the mol ratio of sulfur dichloride to trichloroethylene is about 1:1 to 1:5.

4. The method of claim 1 wherein the mol ratio of sulfur dichloride to trichloroethylene in the reaction approximates 1:1.

References Cited

UNITED STATES PATENTS 3,169,104  2/1965  Pacini et al. _____ 204—158

HOWARD S. WILLIAMS, *Primary Examiner.*

U.S. Cl. X.R.

204—158